Patented Aug. 30, 1949

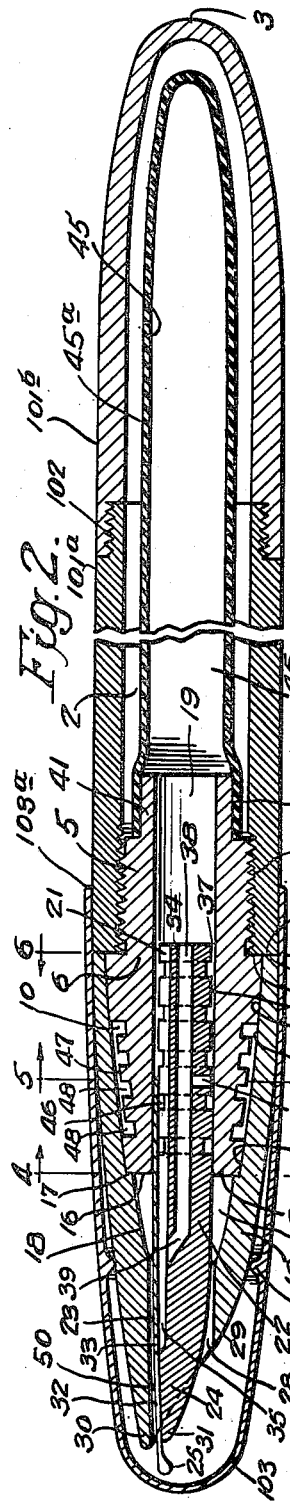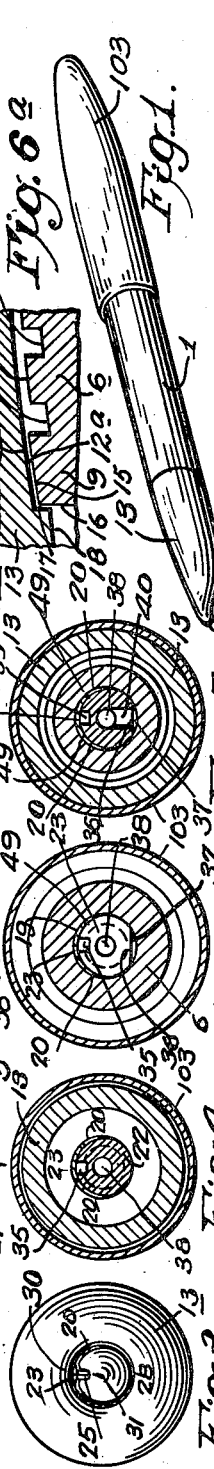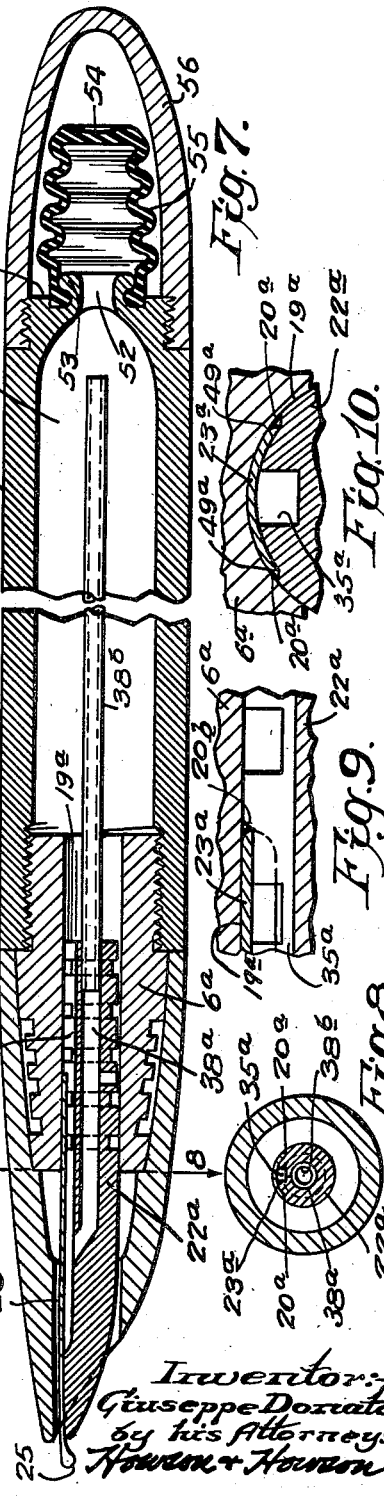

2,480,718

UNITED STATES PATENT OFFICE 2,480,718

FOUNTAIN PEN

Giuseppe Donato, Philadelphia, Pa.; Thomas H. Broomall, Media, Pa., trustee of said Giuseppe Donato, bankrupt Application April 22, 1944, Serial No. 532,275

26 Claims. (Cl. 120—50)

This invention relates to fountain pens of the "wet point" type, i. e. fountain pens having the major portion of the pen point encased and retained in a moistened condition by a fixed conoidal cap from the tip of which only the writing nib of the pen point projects.

Prior to the present invention, the filling of wet point pens has been effected by a diaphragm pump installed within the barrel of the pen adjacent the blank end of the barrel, i. e. the end opposite to that on which the conoidal cap is stably mounted and from which the writing nib projects. An operating plunger for the pump normally projects axially from and beyond the blank end of the barrel, within a removable hollow cap threaded onto the blank end of the barrel.

The barrel of the pen heretofore has served directly as the reservoir for the writing fluid; and the writing fluid has been fed from the reservoir to the pen point by capillary action, through suitable channels connecting the interior of the barrel with the inner and outer surfaces of the body portion of the pen point, within the fixed conoidal cap.

Wet point pens ·e also provided with auxiliary reservoirs formed on the exterior surface of an axial prolongation of the barrel which supports the pen point and projects into the conoidal cap. The flow of writing fluid to the writing nib is controlled by the auxiliary reservoirs during use of the pen.

When a wet point fountain pen is carried in a person's clothing, such as a man's vest pocket for example, with the writing nib of the pen pointing upwardly, the body heat of the person carrying the pen appears to affect the pen in a peculiar manner which causes the writing fluid to move into and collect on the internal surface of conoidal cap, by capillarity. Any material collection of writing fluid forming on the inner surface of the conoidal cap, when the pen is not in use, has a tendency to flood the auxiliary reservoirs, which normally afford a uniform flow of writing fluid to the writing nib of the pen, when the pen is subsequently put into use. This flooding of the control reservoirs causes an excessive amount of writing fluid to be fed to the writing nib and produces a heavier script than is normal for the pen. This abnormal script weight continues until the surplus writing fluid has been consumed and a normal condition again prevails in the control reservoirs.

One object of the present invention is to construct a wet point pen wherein any capillary activity occurring within the pen during non-use thereof, while the pen is being carried in close proximity to a person's body, or, when the pen is subjected to some corresponding condition by which a collection of writing fluid is caused to form on the internal surface of the conoidal cap, will be nullified by a counter-capillary action tending to draw at least a portion of the collecting fluid into a supplementary chamber within the cap. For the purpose of description this supplementary chamber will be hereinafter referred to as a "sweat chamber."

Another object of the invention is to provide the pen with either an axially elongated bulb type of filler, which will also function as the main reservoir for the writing fluid; or with an improved bellows-type of bulb attached to and projecting axially beyond the blank end of the barrel, within a hollow screw cap threaded thereon.

Another object of the invention is to make the pen point, its support, its outer enclosing conoidal cap, and the reservoir bulb, when such bulb is employed, as a unitary structure readily detachable from the barrel of the pen.

Other objects and features of the invention, the details of construction and the mode of operation will be more fully disclosed hereinafter, reference being had to the accompanying drawing, of which:

Fig. 1 is a perspective view of the pen, with the readily removable nib-enclosing cap removed;

Fig. 2 is a longitudinal sectional view, drawn to an enlarged scale, with the nib-enclosing cap in place;

Fig. 3 is an end view of the structure shown in Fig. 1;

Fig. 4 is a transverse sectional view taken on the line 4—4 of Fig. 2;

Fig. 5 is a transverse sectional view taken on the line 5—5, Fig. 2;

Fig. 6 is a transverse sectional view taken on the line 6—6, Fig. 2;

Fig. 6a is an enlarged fragmentary sectional view illustrating in exaggerated degree an important detail of construction;

Fig. 7 is a view similar to Fig. 2 but showing a modification of the invention;

Fig. 8 is a transverse sectional view taken on the line 8—8, Fig. 7; and

Figs. 9 and 10 are enlarged sectional views of a detail of the invention.

The pen disclosed in that form of the present invention shown in Figs. 1 to 6 inclusive, includes a hollow barrel 1 which is provided with an axial bore 2 having a closed blank end 3. The opposite open end of the bore 2 is internally threaded, as indicated at 4, for the reception of cooperating external threads formed on the neck or shank 5 of a plug 6 which normally closes the otherwise open end of the barrel 1.

The plug 6 is provided with an annular shoulder 7, which bears against an annular end wall 8 at the open end of the barrel 1. The shoulder 7 is formed on an axially extending substantially frusto-conical head portion 9 of the plug 6. In the head 9 is formed the annular sweat chamber 10.

Between one end of the sweat chamber 10 and the annular shoulder 7 of the plug 6, the head 9 is provided with a substantially wide external frusto-conical surface 11 which fits into one open end of the conoidal cap 13 which encloses the pen point. The frusto-conical surface 11 of the head 9 has a tight press fit with a corresponding internal frusto-conical surface 12 of the pen-enclosing conoidal cap or shell 13, adjacent said open end thereof. The cap 13 is provided with an annular end surface 14 disposed in the same transverse plane as the annular shoulder 7 of the plug 6 and therewith having bearing against the end surface 8 of the barrel 1. The aforesaid press-fit between the surfaces 11 and 12 unites the cap 13 with the plug 6 so that the plug may be unthreaded and removed from the barrel 1 by forces applied to the cap.

At the opposite end of the sweat chamber 10, the head 9 of the plug 6 is provided with a second external frusto-conical surface 15 which lies in close proximity to the internal frusto-conical surface 12 of the cap 13 in remotely spaced relation to said open end thereof; the relationship between the external frusto-conical surface 15 of the head 9 and the internal frusto-conical surface 12 of the cap 13 is such that between the two a capillary passage 12a is formed (see Fig. 6a), through which under conditions hereinafter set forth ink may pass to and from the chamber 10.

The outer end surface 16 of the head 9 is similarly spaced with respect to an annular shoulder 17 formed on a transverse plane intermediate the ends of the cap 13 and constituting the termination of the internal frusto-conical surface 12 of the cap 13.

A second smaller substantially frusto-conical internal surface 18 is formed within the cap 13, beyond the annular shoulder 17.

The plug 6 is provided with an axial bore 19 which is adapted to receive a cylindrical end portion 21 of a post 22 which supports the concavo-convex pen point 23. The post 22 has a gradually tapering outer end 24 which terminates adjacent the writing nib 25, of the pen point 23.

The tapering end 24 of the pen-supporting post 22, together with the pen point 23, projects axially beyond the end surface 16 of the head 9 of the plug 6, through a frusto-conical cavity 27 defined by the frusto-conical internal surface 18, through a contiguous cylindrical cavity 28 formed in the converging outer end of the shell or cap 13, and extends outwardly beyond the outer end of the cylindrical cavity 28 at the extreme outer end of the cap 13.

The outer end of the cap 13 is formed with a converging surface 29 lying at an angle to the axis of the cap and provides a substantially pointed tip 30 between which and a substantially corresponding pointed tip 31 on the post 22 the writing nib 25 of the pen point 23 extends.

The outer pointed end of the pen point 23 is provided with a longitudinal slit 32 which terminates in a piercing 33 spaced inwardly from the writing nib 25 of the pen point.

One side of the post 22, from a point adjacent the inner end of the longitudinal slit 32 in the pen point 23, to the inner flat end 34 of the post 22, is provided with a longitudinal groove 35. The diametrically opposite side of the cylindrical portion 21 of the post 22, from the flat end 34 of the post to a point spaced inwardly from the end 16 of the head 9, is flattened, as indicated at 36, to provide a longitudinal passage 37 along the underside of the cylindrical portion 21 of the post 22, between the flat surface 36 of the cylindrical portion 21 of the post 22 and the cylindrical surface of the bore 19 in the threaded shank or neck 5 of the plug 6. Intermediate said flattened side 36 and the groove 35, the post 22 is provided with an axial bore 38 which extends inwardly from the flat end 34 of said post and terminates in an angular transverse passage 39 at a point disposed outwardly beyond the end 16 of the head 9.

The transverse bore or passage 39 affords communication between the groove 35 in the post 22 and the inner terminal end of the axial bore 38 thereof. Intermediate the flat end 34 of the post 22 and the flat end 16 of the head 9 the post 22 is provided with a second transverse passage 40, which affords communication between the passage 37 and the bore 38 in the post 22.

As shown in Figs. 4, 5 and 6, the cylindrical portion 21 of the post 22 is of smaller diameter than the bore 19 in the plug 6, to the extent of the thickness of the concavo-convex body of the pen point 23, the difference in diameters being such as to grip the body of the concavo-convex body of the pen point 23 tightly between the interior surface of the bore 19 and the exterior surface of the cylindrical portion 21 of the post 22.

In that form of the invention shown in Fig. 2, the inner end of the plug 6 is provided with a tubular axial extension 41, of smaller diameter than the threaded shank or neck 5 of said plug, for the reception of the open end 42 of a flexible reservoir 45, which for the purpose of the present invention is in the form of an elongated rubber bulb. By laterally collapsing and subsequent releasing the bulb 45 the writing fluid will be drawn through the cap 13 and plug 6 into said bulb and will provide and maintain a supply of writing fluid within the reservoir bulb 45.

The cylindrical portion 21 of the post 22 is provided with a series of substantially annular grooves 46 which are spaced apart along the length of the cylindrical portion 21, from the inner flat end 34 thereof to a point substantially adjacent the outer flat end 16 of the head 9 of the plug 6. The annular grooves 46, 46 function as auxiliary control reservoirs for the writing fluid being fed to the pen point 23.

The annular sweat chamber 10 is provided with a series of annular ribs 47 alternating with annular grooves 48, with the peripheral surfaces of the ribs spaced radially inward from the internal frusto-conical surface 12 of the cap 13.

In order to fill the pen, the unitary structure, including the plug 6, post 22, cap 13 and bulb 45 is removed from the barrel 1 and the tips of the cap 13 and post 22, with the nib 25 of the pen point, are submerged in a body of writing fluid. The bulb is collapsed laterally to expel air therefrom. Upon releasing the bulb 45 a partial vacuum is created therein, by which the writing fluid will be sucked into the axial cavity 28 in the cap 13, then through the piercing 33 in the pen point 23 into the longitudinal groove 35 in the post 22. Some of the fluid will pass into and through the angular transverse passage 39 into the axial bore 38 of the post 22. Both the axial bore 38 and longitudinal groove 35 communicate with the axial bore 19 in the plug, through which the fluid then flows into the bulb reservoir 45.

In normal writing use, with the pen in a vertical slanting position, bringing the groove 35 on the upper side of the pen supporting post 22, the writing fluid passes down through the plug bore 38, the under channel 37 and groove 35, and into the feed regulating annular grooves 46, 46. The writing fluid from the groove 35 passes through the pen piercing 33 into a capillary channel 50 formed in the cap bore 28 between the top or convex surface of the pen point 23 and the adjacent cylindrical segment of the cap bore 28 extending from one longitudinal edge 49 of the pen point 23 to the opposite longitudinal edge 49 of said pen point. Writing pressure applied to the nib 25 of the pen point flexes the pointed extremity of the pen point, behind the nib 25 which slightly spreads the bifurcated end of the pen point and raises the concave side of the two parts thereof slightly off the underlying upper convex surface of the post 22 adjacent the apex 31 thereof. This opens the pen slit 32 slightly and permits minute particles of air to enter the lower end of the groove 35 to bubble up through the writing fluid in said groove to enter the reservoir 45 and partially relieve the vacuum therein, which permits proportionate amounts of the writing fluid to pass to the writing nib 25.

When the writing pressure is released, the concave surface of the pen point 23 reseats on the convex face of the pen post 22. The slit 32 closes and a film of writing fluid remains in the capillary channel 50, keeping the pen point moistened for immediate feeding to the writing nib when writing is resumed.

As the supply of writing fluid nears exhaustion, the annular grooves 46, 46 retain the last of the fluid draining from the reservoir and release it, one after another, to maintain a uniform flow and prevent a sudden rush of air into the reservoir as a result of lessened resistance caused by approaching exhaustion of the fluid therefrom, thus sudden release of excessive amounts of writing fluid to the pen point nib, and consequent flooding and blotting are effectively avoided.

Should any surplus writing fluid accumulate in the chamber 27, during writing, such fluid will drain back into the reservoir 45, when the pen is placed in a substantially vertical position, with the nib 25 pointing upwardly, through side channels 20, 20, formed between the external cylindrical surface of the pen post 22 and the internal cylindrical surface of the plug bore 19, from the point of tangency of said surfaces to the longitudinal side edges 49, 49 of the pen point 23, thence into the plug bore 19 to the reservoir 45.

Should there be any capillary activity during periods of non-use of the pen causing writing fluid to rise along the outer surface of the post 22 and pen 23, with the pen in a vertical position and the nib 25 pointing upwardly, the rising fluid will be intercepted by the adjacently disposed annular edge of the converging frusto-conoidal surface 18 within the cap 13, down which the fluid will move to the end 16 of the plug 6. A counter capillary action causes the fluid to move into the sweat chamber 10, around the annular peripheral corner of the end face 16 and external frusto-conoidal surface 15 of the plug head 9 between the plug and the shoulder 17 and internal frusto-conoidal surface 12 of the cap 13, where the fluid then follows the surfaces of the alternating annular grooves 47 and ribs 48 formed in and on the plug head 9 within the annular sweat chamber 10.

Apparently the fluid entering the sweat chamber 10 moves out again under reverse capillary action when the pen is subsequently put into use and particularly if and when the pen point becomes starved as a result of exhaustion of fluid from the reservoir 45 and reserve channels 46, 46, whereupon the capillary pull in the channel 50 will draw upon any accumulation of fluid which may have found its way into the sweat chamber 10.

In the structure shown in Figs. 7 and 8, the diameter of the bore 19a of the plug 6a and the diameter of the pen post 22a are substantially equal and the one fits within the other tightly. The post 22a is recessed to the shape and thickness of the concavo-convex body of the pen point 23a, so that the convex face of the pen point is flush with the adjacent external cylindrical surface of the post 22a, whereby the drainage channels 20, 20 found in the structure shown in Figs. 4, 5 and 6 is eliminated. However, in the case of the structure shown in Figs. 7 and 8 effective longitudinal drain channels 20a, 20a and a cross drain channel 20b communicating with the feed groove 35a, are formed along the longitudinal edges 49a, 49a of the pen point 23a and around the inner end thereof, as shown in Figs. 8, 9 and 10.

Also, as shown in Fig. 7, the elongated bulb-like resilient reservoir 45 of the structure of Fig. 2 is eliminated, as is the tubular axial extension 41 of the plug 6; and the barrel 1a (Fig. 7) becomes the main reservoir. The end 3a of the barrel 1a is axially bored, as indicated at 52, and is provided with an axially projecting boss 53 annularly ribbed and grooved to receive an open annularly ribbed end of a resilient axially collapsible and expansible bellows pump 55. The bellows 55 is preferably provided with a firm button-like end 54 for collapsing the bellows axially.

The bore 38a of the plug 6a is provided with a long tubular extension 38b reaching axially through the barrel 1a to a point adjacent the inner end of the bore 52 in axial alignment therewith. The bellows bulb 55 is enclosed within a readily removable cap 56 screw threaded on the end of the barrel 1a.

Quick axial collapse and release of the annularly corrugated bellows bulb 54, with the tips of the pen, cap and post submerged in writing fluid effects drawing of the fluid through the tube 38b to the open end thereof to flow therefrom into the surrounding bore of the barrel. By repeating this operation several times the barrel may be completely filled to the end 3a thereof.

The collapsible bulb 55 is normally enclosed by a cap section 1b, screw threaded or otherwise removably attached to the body section 1a of the barrel of the pen.

With further reference to the embodiment of Fig. 2, it is obvious that the cap 13 may be attached to the plug 6 by interengaging screw threads, supplanting the press fit between the frusto-conoidal surface 11 of the plug 6 and the corresponding surface 12 of the cap 13, located adjacent the larger end of the cap, like the cooperating threads by which the plug 6 is removably attached to the barrel 1; or the threaded connection between the plug and the barrel may be supplanted by a smooth friction fit between the neck of the plug 6 and the interior surface of the bore of the barrel 1, without departing from the spirit of the invention.

With further reference to Fig. 2, the barrel 1 in this instance is made in two sections, such as a body section 101a and a cap section 101b joined together by a screw or friction joint 102, whereby, instead of removing the entire unit 6—13—

22—23—45 from the barrel 1, for filling purposes, the cap 101b may be removed from the body 101a of the barrel to expose only the outer end 45a of the reservoir bulb or sack 45 to accomplish the same result. If such a mode of operation is desired the joint between the barrel 1 and plug 6 should be relatively tight so that the break will occur only at the joint 102 when the pen requires filling.

The parts will frictionally hold even with the slight taper illustrated because of the well known elasticity of the materials used in the fountain pen art.

The nib 25 of the pen and the conoidal cap 13 are normally enclosed within an outer closure cap 103 adapted to cover the operating end of the pen, as shown in Fig. 2, or to function as a pen holder extension, as shown in Fig. 1, when the pen is in use. In either instance, the open end 103a of the closure cap 103 frictionally fits the barrel 1, at either end thereof, and is provided with an annular rib, or a series of circumferentially spaced internal radially projecting lugs 103b adapted to engage the converging external surface of the conoidal cap 13 or the corresponding surface of sack enclosing barrel cap 101b, as the case may be, in axially spaced relation to the place where the open end 103a of the outside cap 103 engages the barrel in order to steady the outside cap in place.

I claim:

1. A wet point fountain pen comprising a hollow barrel having an open end, an axially bored closure plug fitted into said end, a head on said plug projecting beyond said barrel end, a pen point and supporting post fitted into one end of the bore and projecting axially beyond the head portion of said plug, a writing fluid main reservoir in said barrel communicating with the opposite end of said bore, a plurality of auxiliary control reservoirs between the opposed surfaces of said bore and post, fluid channels for feeding fluid from said main reservoir along said post to said pen point and auxiliary reservoirs, a conoidal pen point and post enclosing cap carried by said head with a cavity in said cap surrounding said projecting portions of said pen and post intermediate said head and the apex of said cap, and surfaces immediately adjoining said apex disposed in contiguous ink-retaining relation to said point, said cap encasing said point with the exception of the writing nib of the latter, and a sweat chamber formed between said head and said cap adjacent said cavity.

2. A wet point fountain pen comprising a hollow barrel having an open end, an axially bored closure for said end, a pen point, and a pen supporting post mounted in one end of the bore of said closure, a conoidal cap carried by said closure for enclosing said pen and post with only the extreme tip of the pen point exposed beyond the apex of said cap, said cap having surfaces immediately adjoining said apex disposed in contiguous ink-retaining relation to said point, a reservoir in said barrel communicating with the opposite end of said bore, and means for feeding writing fluid from said reservoir to said pen including a longitudinal groove formed in said post and extending directly beneath said pen point, and a series of axially spaced circumferential grooves formed in said post directly beneath said pen point and intersected by said groove.

3. A wet point fountain pen comprising a hollow barrel having an open end, an axially bored closure for said end, a pen point, and a pen supporting post mounted in one end of the bore of said closure, a conoidal cap carried by said closure enclosing said pen and post with only the extreme tip of the pen point exposed beyond the apex of said cap, said cap having adjacent said apex surfaces disposed in contiguous ink-retaining relation to said point, a reservoir in said barrel communicating with the opposite end of said bore, and means for feeding writing fluid from said reservoir to said pen including a longitudinal groove formed in said post and extending directly beneath said pen point, a series of axially spaced circumferential grooves formed in said post directly beneath said pen point and intersected by said groove, an axial bore in said post independent of said circumferential grooves, and a transverse bore connecting said post bore with said groove intermediate the opposite ends of said pen point at a point intermediate the outer end of said pen point and the circumferential groove nearest thereto.

4. A wet point fountain pen comprising a hollow barrel having an open end, an axially bored closure for said end, a pen point and a pen supporting post mounted in and extending axially beyond one end of the bore of said closure, a writing fluid reservoir in said barrel and communicating with the opposite end of said bore, a cap carried by said closure and enclosing the extended portions of said pen point and post with exception of the writing nib of said point, said cap having surfaces disposed in contiguous ink-retaining relation to said point and longitudinal side channels extending along said post within said bore adjacent the opposite longitudinal edges respectively of said pen point and affording communication between said reservoir and the interior of that portion of said cap enclosing said extended portions of said pen and post.

5. A wet point fountain pen comprising a hollow barrel having an open end, an axially bored closure for said end, a pen point and a pen supporting post mounted in and extending axially beyond one end of the bore of said closure, a writing fluid reservoir in said barrel and communicating with the opposite end of said bore, a cap carried by said closure and enclosing the extended portions of said pen point and post with the exception of the writing nib of said point, said cap having surfaces disposed in contiguous ink-retaining relation to said point, longitudinal side channels extending along said post within said bore adjacent the opposite longitudinal edges respectively of said pen point and affording communication between said reservoir and the interior of that portion of said cap enclosing said extended portions of said pen and post, and a plurality of axially spaced circumferential grooves extending around said post and communicating with said side channels.

6. A wet point fountain pen comprising a hollow barrel, a plug normally closing one end of the barrel, a head forming part of said plug and extending axially beyond said end of said barrel, a pen point and a pen supporting post collectively carried by and extending axially beyond said head, a reservoir for writing fluid within said barrel, a hollow conoidal cap carried by said plug and enclosing said head and the relatively extended portions of said post and said pen point with exception of the writing nib of said point, said cap having surfaces disposed in contiguous ink-retaining relation to said point, capillary means for feeding writing fluid from said reservoir to said pen point through said plug, a sweat chamber formed in the peripheral face of the head of said plug, an annular surface on the peripheral face of said head at each end of said sweat chamber, one of said annular surfaces being stably connected to said cap surface to secure said cap to said plug, and the other of said surfaces having a relatively loose fit with said cap surface and affording capillary communication between the interior portion of said cap lying beyond said head and the interior of said sweat chamber.

7. A wet point fountain pen comprising a hollow barrel, a plug normally closing one end of the barrel, a head forming part of said plug and extending axially beyond said end of said barrel, a pen point and a pen supporting post collectively carried by and extending axially beyond said head, a reservoir for writing fluid within said barrel, a hollow conoidal cap carried by said plug and enclosing said head and the relatively extended portions of said post and said pen point with exception of the writing nib of said point, said cap having surfaces disposed in contiguous ink-retaining relation to said point, capillary means for feeding writing fluid from said reservoir to said pen point through said plug, a sweat chamber formed in the peripheral face of the head of said plug, an annular surface on the peripheral face of said head at each end of said sweat chamber, one of said annular surfaces being stably connected to said cap surface to secure said cap to said plug, and the other of said surfaces having a relatively loose fit with said cap surface and affording capillary communication between the interior portion of said cap lying beyond said head and the interior of said sweat chamber, said sweat chamber comprising a series of alternating annular ribs and grooves intermediate said annular surfaces with said ribs spaced radially from the adjacent portions of said inner surface of said cap.

8. A wet point fountain pen comprising a hollow barrel, a plug normally closing one open end of the barrel and having an axial bore of predetermined diameter, a pen point, a supporting post for said pen point of lesser diameter than said bore for jam-fitting said pen point in one end of said bore, a reservoir for writing fluid in said barrel and communicating with the opposite end of said bore, inter-communicating longitudinal and circumferential channels formed in and around said post immediately adjacent the marginal edges of said pen directly beneath said pen for feeding writing fluid from said reservoir to said pen point, and a conoidal cap carried by said plug and enclosing said supporting post and the pen point with exception of the writing nib of said point and having surfaces disposed in contiguous ink-retaining relation to said point.

9. A wet point fountain pen comprising a hollow barrel, a plug normally closing one open end of the barrel and having an axial bore of predetermined diameter, a pen point, a pen supporting post of cross-sectional measurement substantially equal to said bore diameter and jammed in one end of said bore, said post being recessed to a depth substantially equal to the thickness of said pen point, a reservoir for writing fluid communicating with the opposite end of said bore, a conoidal cap enclosing said plug, the said post, and the pen point with exception of the writing nib of the latter and having surfaces disposed in contiguous ink-retaining relation to said point, and inter-communicating longitudinal and transverse channels formed in and around said post immediately adjacent the marginal edges of said pen and directly beneath said pen affording communication between said reservoir to said pen point and the portion of the interior of said cap surrounding said pen point and post.

10. A wet-point fountain-pen comprising a hollow barrel having an open end, an axially-bored closure-plug removably fitted into said end with a portion thereof projecting forwardly beyond said barrel end, a pen-point and supporting-post fitted into the bore of said closure-plug and projecting forwardly somewhat beyond the projecting end of said plug, said pen-point having a writing-nib formed at its free end and extending forwardly somewhat beyond the free end of said supporting-post, and a conoidal cap carried by said projecting portion of said closure-plug and generally enclosing the projecting portions of said pen-point and said supporting-post, said cap having surfaces disposed in contiguous ink-retaining relation to said pen-point, the free end of said conoidal cap being provided with a generally oval-shaped opening lying generally in a plane forming an acute angle with the axis of said cap, the free end of said pen-point extending through the forward end of said opening with the writing-nib protruding slightly therebeyond, the free end of said supporting-post extending through and somewhat beyond the rear end of said opening but terminating somewhat short of the forward end of said opening, the joint between the cap and the closure-plug being tighter than the joint between the barrel and the closure-plug whereby the latter joint can be released without disturbing the former joint and without changing the alignment of the pen-point relative to said opening, thereby to permit removal of the closure-plug pen-point supporting-post and cap as a unitary front-end assembly.

11. A wet point fountain pen comprising a hollow barrel having an open internally threaded end, an apertured closure provided with an annular shoulder arranged to firmly engage the transverse end of said open end of the barrel, external threads on said closure engageable with the internal threads of said barrel for effecting and maintaining the engagement of said shoulder with said transverse end surface of said barrel, a pen point and a point-supporting post mounted in and projecting from said closure, a closure-embracing cap encasing the projecting portions of said post and point with exception of the writing nib of the latter and having surfaces disposed in contiguous ink-retaining relation to said point, said cap having an inclined opening formed at its forward end through which the pen point extends in predetermined relationship, said cap being secured tightly to said closure so as to form therewith and with said post and point a unified assembly removable as such from the barrel and without disturbing the alignment of the pen point relative to the cap opening, and said cap having a transverse end surface substantially flush with said annular shoulder for simultaneous engagement thereof with said transverse end surface of the barrel, and a resilient ink-sac mounted on said closure and extending therefrom into said barrel and removable from said barrel with said unified assembly.

12. A wet point fountain pen comprising a hollow barrel having an open end, an axially bored closure constructed and arranged for screw-threaded engagement with said barrel in fluid-tight relationship with said end, a pen point and a point-supporting post mounted in and projecting from the outer end of the bore of said closure, and a cap carried by said closure and encasing the projecting portions of said post and point with exception of the writing nib of the latter and having surfaces disposed in contiguous ink-retaining relation to said point, said cap having an inclined opening formed at its forward end through which the pen point extends in predetermined relationship, said cap being disposed in abutting end-to-end relationship with the open end of said barrel when said closure is fully engaged, said cap being fitted upon said closure with a relatively fixed force-fit joint so that manipulation of the cap to separate the screw-threaded engagement of the closure with the barrel will not disturb said force-fit joint whereby the cap point post and closure may be removed from the barrel as a unitary front-end assembly and without disturbing the pre-determined relationship of the point and the cap opening.

13. A wet point fountain pen comprising a hollow barrel having an open end, an axially bored closure plug screw-threadedly fitted into said end, a head on said plug projecting beyond said barrel end, a pen point and supporting post fitted into the bore in said head, and a cap press-fitted upon and enclosing said head and having an inclined opening at the outer end thereof, the pen point extending through said opening in predetermined relationship therewith and exposing the writing nib of said pen point, said cap encasing said post and point with exception of the nib of the latter and having surfaces disposed in contiguous ink-retaining relation to said point rearwardly of said nib, the press-fit of said cap upon said head being sufficiently tight to prevent relative movement of said cap and said plug when said cap is manually rotated to screw or unscrew the plug from the barrel whereby the cap point post and plug can be removed from the barrel as a unitary front-end assembly and without disturbing the predetermined relationship of the point and the cap-opening.

14. A wet point fountain pen comprising a hollow barrel having an open end, an axially bored closure plug screw-threadedly fitted into said end, a head on said plug projecting beyond said barrel end, a pen point and supporting post fitted into the bore at one end of said plug, a writing fluid reservoir mounted on said plug and communicating with said bore at the opposite end of said plug, a cap fitted upon and enclosing said head and having an inclined opening at the outer end thereof, the pen point extending through said opening in predetermined relationship therewith and exposing the writing nib of said pen point, said cap encasing said post and point with exception of the nib of the latter and having surfaces disposed in contiguous ink-retaining relation to said point rearwardly of said nib, and fluid channels in said post for feeding fluid from said reservoir to said pen point, the fit of said cap upon said head being sufficiently tight to prevent relative movement of said cap and said plug when said cap is manually rotated to screw or unscrew the plug from the barrel whereby the cap point post plug and reservoir can be removed from the barrel as a unitary front-end assembly and without disturbing the predetermined relationship of the point and the cap-opening.

15. In a fountain pen including a barrel, a unitary front end structure comprising a point, ink feeding means for controlling the flow of ink to the point, an enclosing shell, and a nipple having a joint with the shell and holding the point and feeding means in operative relation with the shell, said shell having an inclined opening formed at its forward end through which the point extends in predetermined relationship, said nipple having a manually detachable joint with the barrel, the first-mentioned joint being tighter than the manually detachable joint whereby the shell can be manually rotated to disengage the shell, point, feeding means and nipple from the barrel as a unitary front-end assembly without disturbing the first-mentioned joint and without disturbing the predetermined relationship of the point with the shell opening.

16. In a fountain pen having a barrel, a unitary front-end structure comprising a point, ink feeding means for controlling the flow of ink to the point, an enclosing shell, and a member rigidly securing the point and feeding means in operative relation with the shell and constructed for detachable engagement with the barrel whereby the front-end structure may be assembled as a unit, the unit being readily securable to the barrel, said shell having an inclined opening through which the point extends in predetermined relationship, said front-end structure being manually detachable from said barrel as a unitary assembly and without disturbing the predetermined relationship of the point and the shell opening.

17. In a fountain pen having a barrel, a unitary front-end structure comprising a point, ink feeding means for controlling the flow of ink to the point, a nipple carrying said point and said feeding means, and a shell enclosing said feeding means and the major portion of said point, said shell having an inclined opening formed at its forward end through which the point extends in predetermined relationship, said shell and said nipple being tightly secured together to hold the feeding means and point in operative relation with each other and with the shell, and said nipple being constructed for detachable engagement with the barrel whereby the front-end structure may be assembled on and detached from the barrel as a unit and without disturbing the predetermined relationship of the point and the shell opening.

18. In a fountain pen having a barrel, a unitary front-end structure comprising a point, feeding means comprising a governor and a feed bar, said feed bar and said point being carried by said governor, a nipple carrying said governor, and a shell having an inclined opening formed at its forward end through which the point extends in predetermined relationship, the said shell enclosing said feeding means and tightly secured to said nipple to hold the point, governor and feed bar in operative relation with the shell, said nipple being constructed for detachable engagement with the barrel to permit the front-end structure as a unit to be assembled on and detached from the barrel and without disturbing the predetermined relationship of the point and the shell opening.

19. In a fountain pen having a barrel, a unitary front-end structure comprising a point, feeding means carrying said point, a nipple carrying said feeding means, and a shell enclosing said feeding means and a major portion of said point and having an inclined opening formed at its forward end through which the point extends in predetermined relationship, the rear end of said shell being threaded on one end of said nipple to hold the point, feeding means and shell in operative relation, the other end of said nipple being threaded for detachable engagement with the barrel whereby the front-end structure may be detached from the barrel as a unit and without disturbing the predetermined relationship of the point and the shell opening.

20. In a fountain pen having a barrel, a unitary front-end structure comprising a point, a feed bar, a governor having a bore frictionally receiving the point and feed bar, said governor having a shank at its rear end, a nipple having a bore frictionally receiving said shank, and an outer shell having an inclined opening formed at its forward end through which the point extends in predetermined relationship, the rear end of said shell being threaded on the front end of said nipple and thereby holding the point, feed bar and governor in operative relation to the shell, said nipple having its rear end threaded for detachable engagement in the barrel, the threaded connection between the shell and the nipple affording greater frictional resistance to turning than the threaded connection between the nipple and the barrel whereby the front-end structure may be detached from the barrel as a unit and without disturbing the predetermined relationship of the point and the shell opening.

21. In a fountain pen having a barrel, a unitary front-end structure comprising a point, feeding means, a shell enclosing said feeding means and a major portion of said point, and a nipple having a joint with said shell and holding the point, feeding means and shell in operative relation, said shell having an inclined opening formed at its forward end through which the point extends in predetermined relationship, said nipple having a manually detachable joint with the barrel, the first-mentioned joint being tighter than the manually detachable joint whereby the shell can be manually rotated to disengage the shell, point, feeding means and nipple from the barrel as a unitary front-end assembly without disturbing the first-mentioned joint and without disturbing the predetermined relationship of the point with the shell opening.

22. In a fountain pen having a barrel, a unitary front-end structure comprising a point, feeding means, an enclosing shell having an inclined opening formed at its forward end through which the point extends in predetermined relationship, and a nipple threaded into the rear of the shell and holding the point, feeding means and shell in operative relation, said nipple being threaded for engagement with the barrel, the threaded connection between the shell and the nipple affording greater frictional resistance to turning than the threaded connection between the nipple and the barrel whereby the front structure may be readily removed from the barrel as a unit and without disturbing the predetermined relationship of the point and the shell opening.

23. In a fountain pen having a barrel, a unitary front-end structure comprising a shell having an internal shoulder adjacent its front end, a point extending from the front end of said shell, feed control means within said shell, a nipple secured in the rear end of said shell for holding the parts in assembled relation, and means to limit the forward position of the latter within the shell, said nipple having a manually detachable joint with said barrel adapted to yield when the shell is manipulated so that the front-end structure is detachable from the barrel as a unit.

24. In a fountain pen having a barrel, a unitary front-end structure comprising a shell having an opening in its front end and having an internal shoulder adjacent its front end, a point extending through said opening, a governor within said shell and carrying the point, a nipple fitted in the rear end of said shell and carrying said governor, and spacing means disposed at the front end of said governor and abutting said shoulder to limit the forward position of the governor relative to the shell and thus limit the projection of the point through said opening, said nipple being constructed for detachable engagement with said barrel, the fit between the nipple and the shell being tighter than the engagement between the nipple and the barrel whereby the shell can be manually grasped and manipulated to disengage the front-end structure from the barrel as a unit.

25. In a fountain pen, the combination of a barrel and a unitary front-end structure assembly detachably secured to said barrel, said front-end structure comprising a shell having an inclined opening formed at its forward end, a point extending through said opening in predetermined relationship thereto, feed control means within said shell, and a nipple extending into the shell and adapted firmly to hold the point and the feed control means in operative relationship to the shell, said nipple being tightly secured to the shell so as to resist relative movement when the shell is manually grasped and manipulated to remove the front-end structure from the barrel whereby the predetermined relationship of the point and the shell opening is maintained during such removal.

26. In a fountain pen, the combination of a barrel and a unitary front-end structure assembly detachably secured to said barrel, said front-end structure comprising a shell having an inclined opening formed at its forward end, a point extending through said opening in predetermined relationship thereto, and a nipple extending into the shell and adapted firmly to hold the point in operative relation to the shell, said nipple being tightly secured to the shell so as to resist relative movement when the shell is manually grasped and manipulated to remove the front-end structure from the barrel whereby the predetermined relationship of the point and the shell opening is maintained during such removal.

GIUSEPPE DONATO.

REFERENCES CITED

The following references are of record in the file of this patent:

UNITED STATES PATENTS

| Number | Name | Date |
| --- | --- | --- |
| 717,873 | Levy | Jan. 6, 1903 |
| 737,697 | Bolles | Sept. 1, 1903 |
| 1,875,507 | Savio | Sept. 6, 1932 |
| 2,005,179 | Chamberlain | June 18, 1935 |
| 2,035,278 | Sager | Mar. 24, 1936 |
| 2,105,189 | Hanle | Jan. 11, 1938 |
| 2,149,557 | Snodgrass | Mar. 7, 1939 |
| 2,223,541 | Baker | Dec. 3, 1940 |
| 2,234,812 | Snodgrass | Mar. 11, 1941 |
| 2,282,840 | Wing | May 12, 1942 |
| 2,305,287 | Weigel | Dec. 15, 1942 |
| 2,316,479 | Weigel | Apr. 3, 1943 |
| 2,328,116 | Weigel | Aug. 31, 1943 |
| 2,335,223 | Weigel | Nov. 23, 1943 |